United States Patent
Xie et al.

(10) Patent No.: US 7,359,041 B2
(45) Date of Patent: Apr. 15, 2008

(54) METHOD AND SYSTEM FOR OPTICALLY TRACKING A TARGET USING A TRIANGULATION TECHNIQUE

(75) Inventors: Tong Xie, San Jose, CA (US); Marshall Thomas DePue, San Mateo, CA (US); Douglas M. Baney, Los Altos, CA (US)

(73) Assignee: Avago Technologies ECBU IP Pte Ltd, Singapore (SG)

( * ) Notice: Subject to any disclaimer, the term of this patent is extended or adjusted under 35 U.S.C. 154(b) by 0 days.

(21) Appl. No.: 10/655,944

(22) Filed: Sep. 4, 2003

(65) Prior Publication Data
US 2005/0052635 A1 Mar. 10, 2005

(51) Int. Cl.
*G01C 1/00* (2006.01)
*G01B 11/26* (2006.01)

(52) U.S. Cl. ............................. 356/141.1; 356/139.04; 356/139.07; 356/623

(58) Field of Classification Search ........ 356/3.01–3.1, 356/602, 622, 623, 139.04, 139.07, 140, 356/141.1, 141.4, 154
See application file for complete search history.

(56) References Cited

U.S. PATENT DOCUMENTS

| | | | | |
|---|---|---|---|---|
| 3,613,066 A | * | 10/1971 | Cooreman | 341/5 |
| 4,294,543 A | * | 10/1981 | Apple et al. | 356/621 |
| 4,654,648 A | * | 3/1987 | Herrington et al. | 345/179 |
| 4,782,328 A | * | 11/1988 | Denlinger | 341/5 |
| 4,788,441 A | * | 11/1988 | Laskowski | 250/559.38 |
| 5,148,016 A | * | 9/1992 | Murakami et al. | 250/221 |
| 5,317,140 A | * | 5/1994 | Dunthorn | 250/221 |
| 5,525,764 A | * | 6/1996 | Junkins et al. | 178/18.01 |
| 6,130,663 A | * | 10/2000 | Null | 345/158 |
| 6,256,016 B1 | * | 7/2001 | Piot et al. | 345/166 |
| 6,433,780 B1 | * | 8/2002 | Gordon et al. | 345/166 |
| 6,473,167 B1 | * | 10/2002 | Odell | 356/141.4 |
| 6,760,009 B2 | * | 7/2004 | Omura et al. | 345/157 |
| 6,819,436 B2 | * | 11/2004 | Ono | 356/614 |
| 2002/0143506 A1 | * | 10/2002 | D'Aligny et al. | 703/6 |
| 2003/0083844 A1 | * | 5/2003 | Reddi et al. | 702/150 |

FOREIGN PATENT DOCUMENTS

GB 1 334 123 A 10/1973

* cited by examiner

*Primary Examiner*—Isam Alsomiri

(57) ABSTRACT

An optical position-tracking system comprises a first light beam steering device for sweeping a first light beam through a first angular range to cause a reflection of the first light beam by a target. Additionally, the optical position-tracking system further comprises a second light beam steering device for sweeping a second light beam through a second angular range to cause a reflection of the second light beam by the target. Moreover, the optical position-tracking system enables determination of a position of the target using a triangulation technique utilizing a first angular value of the first light beam and a second angular value of the second light beam. The first angular value and the second angular value depend on the existence of the respective reflection.

20 Claims, 6 Drawing Sheets

US 7,359,041 B2

METHOD AND SYSTEM FOR OPTICALLY TRACKING A TARGET USING A TRIANGULATION TECHNIQUE

BACKGROUND OF THE INVENTION

1. Field of the Invention

The invention generally relates to optical systems. More particularly, the invention relates to optically tracking a target using a triangulation technique.

2. Related Art

A variety of systems and devices have been developed to enable the input of data into a computer system and to enable the navigation/cursor control for operating the computer system. The tremendous growth in the use of computer systems can be linked to advancements in these systems and devices.

These systems and devices typically utilize one of several technologies. Examples of these technologies include mechanical track-balls, acceleration detection, optical image correlation, laser speckle pattern analysis, and intensity detection. Other technologies are also used.

Although improvements in these systems and devices enhance the usability of computer systems, several deficiencies in the technologies implemented by these systems and devices continue to limit the potential benefits of these systems and devices. For example, technologies that have a limited resolution hinder use of the computer system. Moreover, the response time of some of these technologies can be slow. Other technologies can be used only on particular surface types. Moreover, power consumption issues arise in certain technologies. Lastly, the size required for systems or devices to implement some technologies can be disadvantageous.

Besides these deficiencies, other issues are associated with these existing technologies. In general, these existing technologies are limited to two-dimensional navigation/cursor control and relative coordinate tracking (e.g., change in position). That is, the change in the position of an object is tracked in two-dimensional space rather than the absolute position (e.g., current position) of the object. Relative coordinate tracking limits the usability of these system and devices in such applications as handwriting input, where absolute position tracking is needed. In sum, existing technologies have serious limitations that are difficult to overcome.

SUMMARY OF THE INVENTION

A method and system for optically tracking a target using a triangulation technique are disclosed. An optical position-tracking system comprises a first light beam steering device for sweeping a first light beam through a first angular range to cause a reflection of the first light beam by a target. Additionally, the optical position-tracking system further comprises a second light beam steering device for sweeping a second light beam through a second angular range to cause a reflection of the second light beam by the target. Moreover, the optical position-tracking system enables determination of a position of the target using a triangulation technique utilizing a first angular value of the first light beam and a second angular value of the second light beam. The first angular value and the second angular value depend on the existence of the respective reflection.

BRIEF DESCRIPTION OF THE DRAWINGS

The accompanying drawings, which are incorporated in and form a part of this specification, illustrate embodiments in accordance with the invention and, together with the description, serve to explain the principles of embodiments in accordance with the invention.

DETAILED DESCRIPTION OF THE INVENTION

Reference will now be made in detail to embodiments in accordance with the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments in accordance with the invention, numerous specific details are set forth in order to provide a thorough understanding of the invention.

In embodiments in accordance with the invention, an optical position-tracking system comprises a light beam generator for generating a first light beam and a second light beam. Continuing, the optical position-tracking system further includes a first light beam steering device for sweeping the first light beam through a first angular range and for directing a reflection of the first light beam to a first detector when the first light beam is reflected by a target. The reflection of the first light beam comprises a first reflected light beam. Moreover, the optical position-tracking system has a second light beam steering device for sweeping the second light beam through a second angular range and for directing a reflection of the second light beam to a second detector when the second light beam is reflected by the target. The reflection of the second light beam comprises a second reflected light beam. A first distance separates the first and second light beam steering devices. Additionally, the optical position-tracking system further comprises a processing unit for determining a position of the target using a triangulation technique and data including a first angular value of the first light beam when the target reflects the first light beam, a second angular value of the second light beam when the target reflects the second light beam, and the first distance.

Structure

Figure 1:
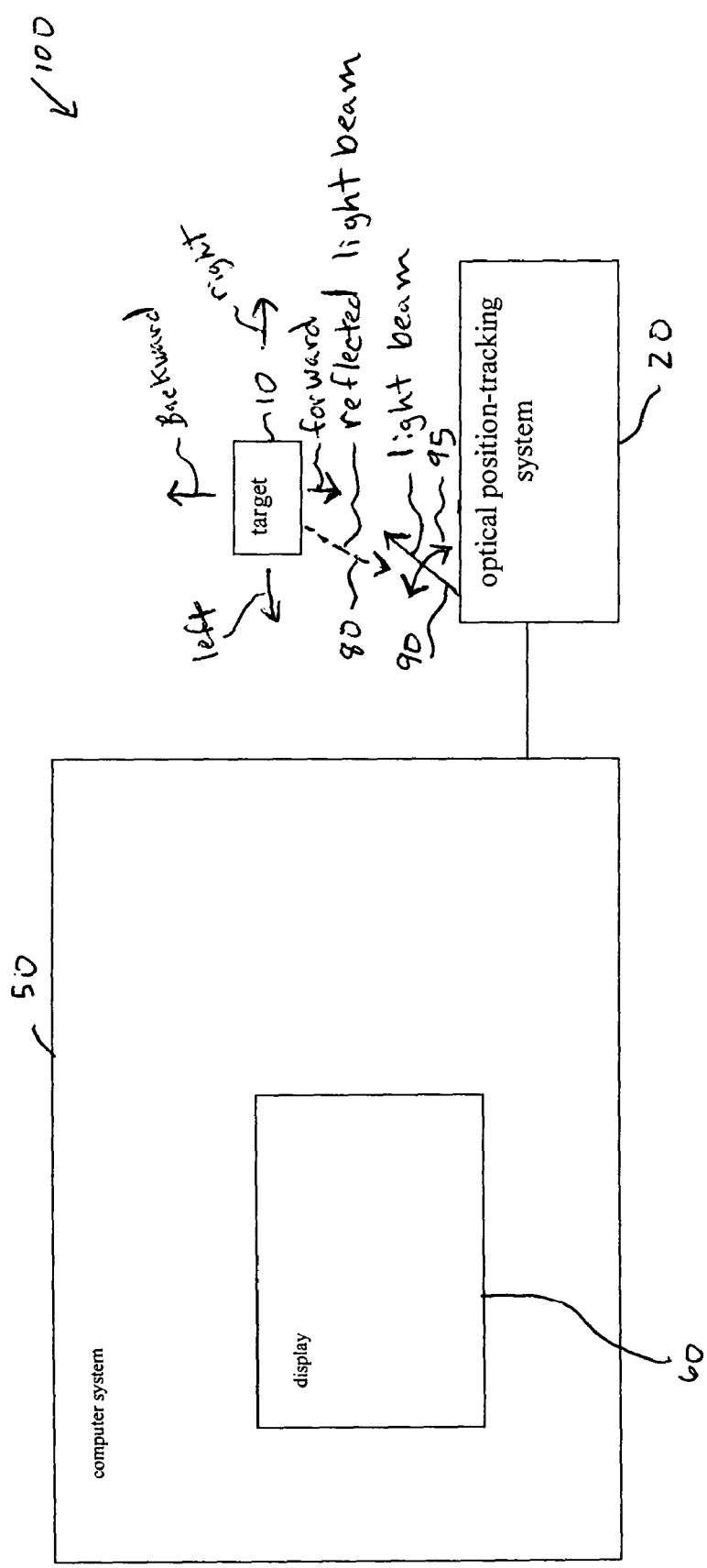
FIG. 1 illustrates a system of embodiments in accordance with the invention, showing an optical position-tracking system.

With reference to FIG. 1, a view is shown of a system 100 of embodiments in accordance with the invention, showing an optical position-tracking system 20. Moreover, with reference to FIG. 2, a view is shown of an optical position-tracking system 200 for tracking the absolute position of a target 205 of embodiments in accordance with the invention. The following discussion will begin with a description of the physical structure of the embodiments in accordance with the invention. This discussion will then be followed with a description of the operation of the embodiments in accordance with the invention.

With respect to the physical structure of the embodiments in accordance with the invention, FIG. 1 illustrates a system 100 of embodiments in accordance with the invention, showing an optical position-tracking system 20. The system 100 includes a computer system 50 and an optical position-tracking system 20. The computer system 50 has a display 60.

In this embodiment in accordance with the invention, the optical position-tracking system 20 tracks the position of target 10 as target 10 is moved in a two-dimensional space. In particular, position-tracking system 20 utilizes at least one light beam 90 that is swept through an angular range 95 within the two-dimensional space. As target 10 is moved left, right, forward, backward, or in any combination thereof within the two-dimensional space in which the light beam 90 is operating, the target may reflect the light beam 90. This reflection of the light beam 90 is comprised of a reflected light beam 80 that is received and processed by position-tracking system 20 to track the position of target 10.

The target 10 can be any type of object. For example, target 10 can be a mouse-type device, a pen, a touch screen input-type device, a finger, and the like. A retro-reflecting surface on target 10 enhances the capability of optical position-tracking system 20 to track the movement of target 10. If the target 10 has a sufficient reflective property, the retro-reflecting surface may not be necessary.

The motion of target 10 tracked by optical position-tracking system 20 by generating position data corresponding to the position of target 10 can be utilized to input data (e.g., handwriting input) into computer system 50, to navigate on display 60, or to control a cursor of computer system 50.

In another embodiment in accordance with the invention, optical position-tracking system 20 is integrated with display 60 to provide touch screen functionality when the target 10 is moved around the surface of display 60. This implementation is less costly and less complicated than touch screen implementations of the prior art.

Figure 2:
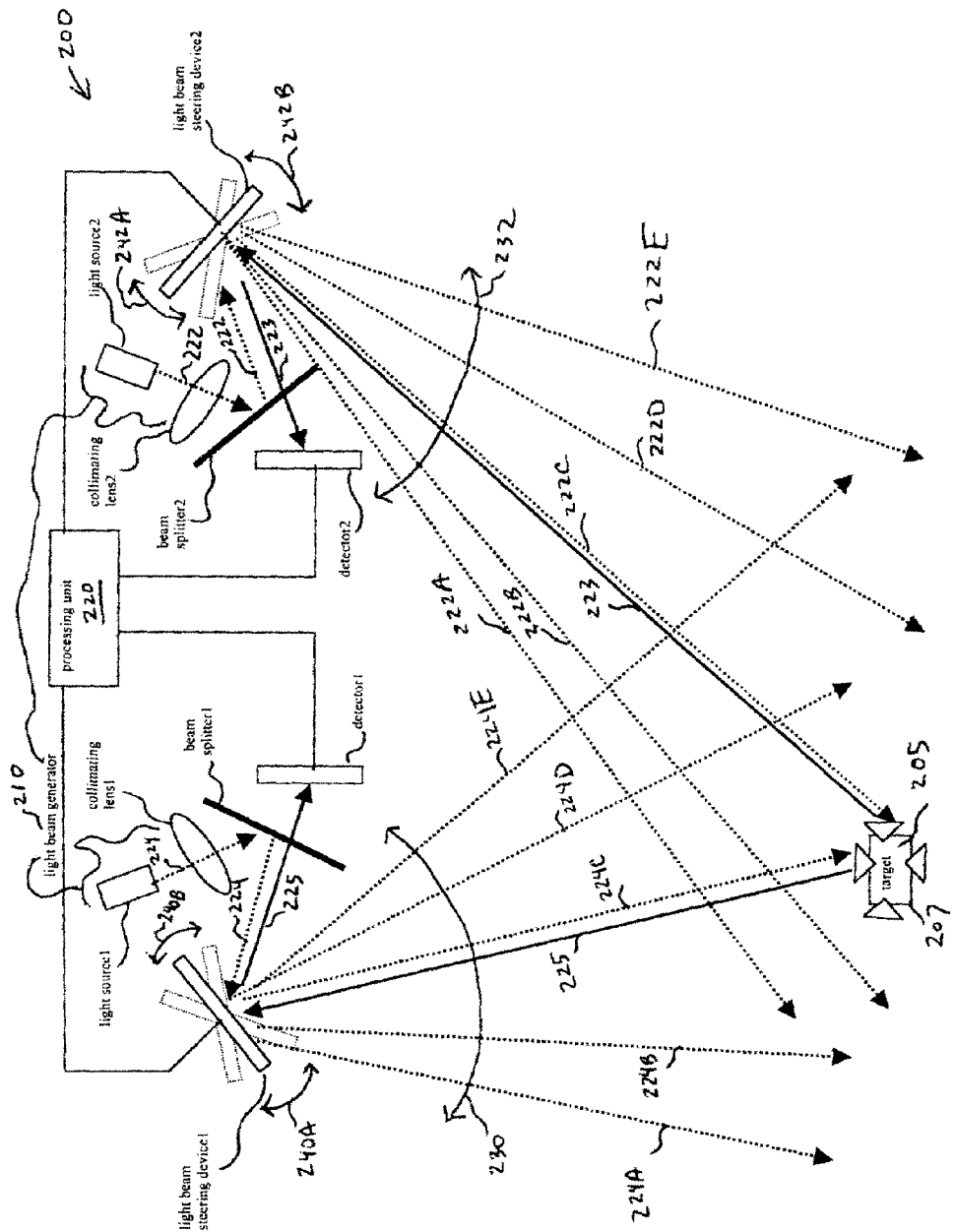
FIG. 2 illustrates an optical position-tracking system for tracking the absolute position of a target of embodiments in accordance with the invention.

FIG. 2 illustrates an optical position-tracking system 200 for tracking the absolute position of a target 205 of embodiments in accordance with the invention. As depicted in FIG. 2, optical position-tracking system 200 has a light beam generator 210, a light beam steering device1, a light beam steering device2, a detector1, a detector2, and a processing unit 220. Additionally, optical position-tracking system 200 includes a beam splitter1 and a beam splitter2. In summary, the angular relationships of target 205 with respect to light beam steering device1 and light beam steering device2 are determined in conjunction with detector1 and detector2. Further, the position of light beam steering device1, the position of light beam steering device2, and the distance separating light beam steering device1 and light beam steering device2 are known. Thereafter, using this information, a triangulation calculation is performed to yield the absolute position of target 205.

Light beam generator 210 generates a first light beam 224 and a second light beam 222. In order to illustrate the sweeping motion of first light beam 224 caused by light beam steering device1, FIG. 2 depicts first light beam 224 in various angular locations (e.g., 224A-224E). Similarly, to illustrate the sweeping motion of second light beam 222 caused by light beam steering device2, FIG. 2 depicts second light beam 222 in various angular locations (e.g., 222A-222E).

Referring still to FIG. 2, light beam generator 210 includes a light source1 to generate first light beam 224 and a light source2 to generate second light beam 222. Moreover, light beam generator 210 has a collimating lens1 and a collimating lens2. In another embodiment in accordance with the invention, light beam generator 210 has a single light source for providing a light beam, which can be split to generate first light beam 224 and second light beam 222.

In one embodiment in accordance with the invention, the light source (e.g., light source1 and light source2) can be based on low-cost LED (light emitting diode) technology. In another embodiment in accordance with the invention, the light source can be based on VCSEL (vertical cavity surface emitting laser) technology. In yet another embodiment in accordance with the invention, the light source can be based on low-cost incandescent technology having suitable collimation capability. In still another embodiment in accordance with the invention, the light source can be based on high power rare-earth based lasers. Examples of rare-earth based lasers include Nd-YAG (Neodymium Yttrium Aluminum Garnet) lasers and pulsed Erbium lasers. The high power rare-earth based lasers can be used when the distance or absorption between the target 205 and the detector is such that higher optical powers are required.

Figure 3:
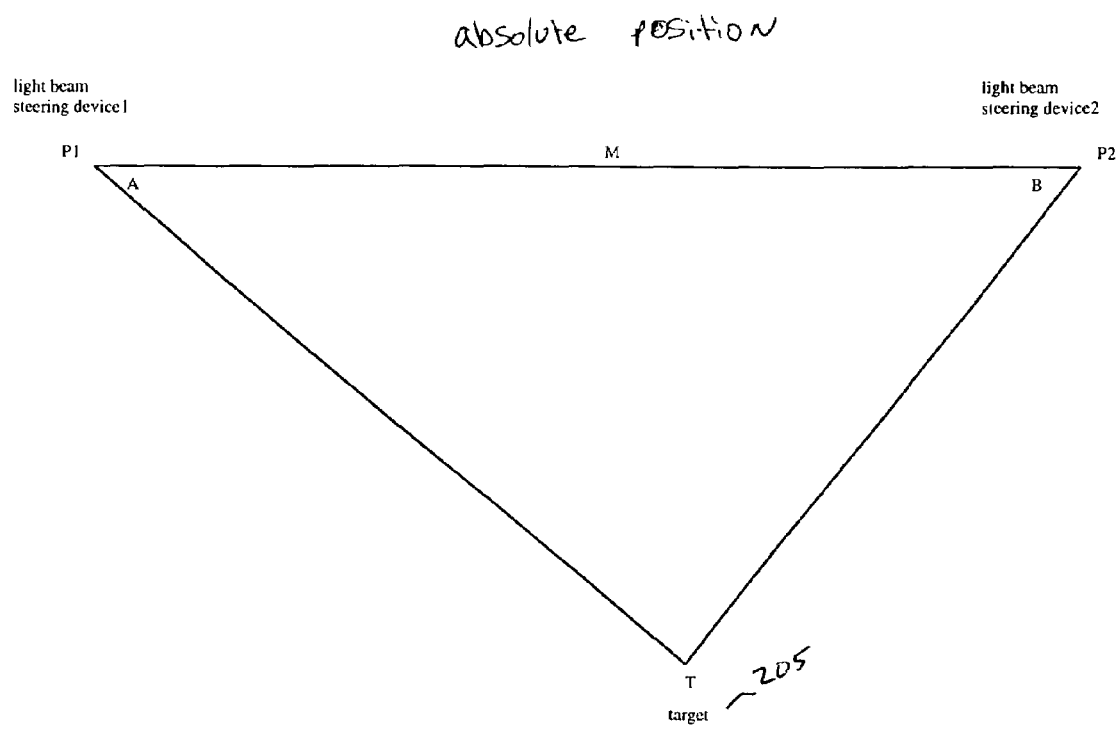
FIG. 3 illustrates the absolute position of a target determined by the optical position-tracking system of FIG. 2 of embodiments in accordance with the invention.

Light beam steering device1 sweeps first light beam 224 through the angular range 230. Also, the angle of first light beam 224 with respect to target 205 and light beam steering device1 is tracked. This is depicted in FIG. 3 and will be discussed below in detail. Light beam steering device2 sweeps second light beam 222 through the angular range 232. Additionally, the angle of second light beam 222 with respect to target 205 and light beam steering device2 is tracked. This is depicted in FIG. 3 and will be discussed below in detail.

Continuing, light beam steering device1 and light beam steering device2 can be any type of light beam steering device. In one embodiment in accordance with the invention, the light beam steering device is a MEMS (microelectromechanical system) motor beam steering device. In another embodiment in accordance with the invention, the light beam steering device is a galvanometer beam steering device. In yet another embodiment in accordance with the invention, the light beam steering device is an acousto-optic beam steering device. In another embodiment in accordance with the invention, the light beam steering device is an electro-optic beam steering device. In still another embodiment in accordance with the invention, the light beam steering device is a grating structure beam steering device. In another embodiment in accordance with the invention, the light beam steering device is a holographic structure beam steering device. In another embodiment in accordance with the invention, the light beam steering device is a scanning mirror beam steering device. Substantial cost and size savings may be realized with MEMS processing.

As shown in FIG. 2, target 205 includes a retro-reflecting surface 207 for reflecting first light beam 224 and second light beam 222. The term "retro-reflecting" refers to the property that an incident light beam is reflected in a parallel direction with respect to the incident light beam. The retro-reflecting surface 207 can be implemented in any manner such as retro-reflecting tape, retro-reflecting paint, or any other retro-reflecting material coupled to the surface of target 205. As described above, the target 205 can be any type of object. For example, target 205 can be a mouse-type device, a pen, a touch screen input-type device, a finger, and the like. If target 205 has a sufficient reflective property, the retro-reflecting surface may not be necessary as long as target 205 reflects an incident light beam in a parallel direction with respect to the incident light beam. As one example, the motion of an office pen with a retro-reflecting surface at the writing end can be tracked and used as the cursor control of a computer system.

In an embodiment in accordance with the invention, detector1 is a photodiode and detector2 is a photodiode. Detector1 and detector2 can be implemented in another manner in other embodiments in accordance with the invention.

Moreover, processing unit 220 is coupled to the light beam steering device1, detector1, light beam steering device2, and detector2. Processing unit 220 determines the position of the target 205 by using a variety of data and a triangulation technique. In an embodiment in accordance with the invention, the absolute position of the target 205 is determined.

In Operation

The following discussion sets forth in detail the operation of embodiments in accordance with the invention.

With reference to FIG. 2, the operation of optical position-tracking system 200 proceeds as follows. Light source1 generates first light beam 224. First light beam 224 passes through collimating lens1, which collimates first light beam 224. After collimating lens1, first light beam 224 propagates towards beam splitter1, which directs first light beam 224 to light beam steering device1. Light beam steering device1 sweeps first light beam 224 through the angular range 230 so that first light beam 224 appears at various angular positions (e.g., 224A-224E). Here, the arrows 240A and 240B show the light beam steering device1 moving so that first light beam 224 is swept through the angular range 230.

Similarly, light source2 generates second light beam 222. Second light beam 222 passes through collimating lens2, which collimates second light beam 222. After collimating lens2, second light beam 222 propagates towards beam splitter2, which directs second light beam 222 to light beam steering device2. Light beam steering device2 sweeps second light beam 222 through the angular range 232 so that second light beam 222 appears at various angular positions (e.g., 222A-222E). Here, the arrows 242A and 242B show the light beam steering device2 moving so that second light beam 222 is swept through the angular range 232. As depicted in FIG. 2, light beam steering device1 and light beam steering device2 are concurrently steering the respective light beams through the respective angular range.

When retro-reflecting surface 207 of target 205 reflects first light beam 224 (e.g., 224C), the reflection of first light beam 224C is reflected towards light beam steering device1. The reflection of first light beam 224C is comprised of a first reflected light beam 225. Light beam steering device1 directs first reflected light beam 225 to beam splitter1 and to detectors. Detector1 detects first reflected light beam 225 and indicates to processing unit 220 that target 205 was located so that processing unit 220 records the current angle (e.g., angle A of FIG. 3) of first light beam 224C. In an embodiment in accordance with the invention, processing unit 220 tracks the angle of first light beam 224 swept by light beam steering device1.

When retro-reflecting surface 207 of target 205 reflects second light beam 222 (e.g., 222C), the reflection of second light beam 222C is reflected towards light beam steering device2. The reflection of second light beam 222C is comprised of a second reflected light beam 223. Light beam steering device2 directs second reflected light beam 223 to beam splitter2 and to detector2. Detector2 detects second reflected light beam 223 and indicates to processing unit 220 that target 205 was located so that processing unit 220 records the current angle (e.g., angle B of FIG. 3) of second light beam 222C. In an embodiment in accordance with the invention, processing unit 220 tracks the angle of second light beam 222 swept by light beam steering device2.

Moreover, processing unit 220 determines the absolute position of target 205 using the above data and the triangulation technique illustrated in FIG. 3. In particular, FIG. 3 illustrates the absolute position T of target 205 determined by optical position-tracking system 200 of FIG. 2 of embodiments in accordance with the invention. As shown in FIG. 3, the position P1 of light beam steering device1, the position P2 of light beam steering device2, and the distance M, which separates light beam steering device1 and light beam steering device2, are known. The angle A corresponds to the angle at which first light beam 224 was reflected by target 205, causing detector1 to detect first reflected light beam 225. Moreover, the angle B corresponds to the angle at which second light beam 222 was reflected by target 205, causing detector2 to detect second reflected light beam 223. As described above, the angular values of first light beam 224 and second light beam 222 are tracked. The data described above and a triangulation technique enables the determination of the absolute position T of target 205, whereas the triangulation may involve the use of trigonometric functions.

Although FIGS. 1 and 2 illustrate two-dimensional target tracking with a pair of light beam steering devices, it should be understood that embodiments in accordance with the invention can be extended to include three-dimensional target tracking by including a light beam steering device along the third dimension.

Optical position-tracking system 200 provides numerous advantages. The motion of the target can be tracked in two-dimensions or in three-dimensions while providing absolute position data of the target. In a relative position tracking system of the prior art, determination of new position of a target depends on the prior position of the target. When the target is moved in a manner that can not be tracked (e.g., lifting a mouse from a surface), the relative position tracking system of the prior art cannot determine a new position until the target again moves in a manner that can be tracked. In contrast, if the target is moved in a handwriting manner in the light beam sweeping space of optical position-tracking system 200, absolute position data gives the current location of the target irrespective of the prior position, facilitating handwriting input into a computer system. Even if the target is moved out of range of the light beam sweeping space of optical position-tracking system 200 (e.g., by lifting the target above the light beam sweeping space), the absolute position of the target can be determined immediately after the target moves into range of the light beam sweeping space of optical position-tracking system 200.

Moreover, the optical position-tracking system 200 can provide high resolution tracking of the target while not being limited to particular surface types for the target. For example, the mechanical track-ball mouse of the prior art requires a smooth surface to operate properly while the optical mouse of the prior art has difficulty with pure white surfaces. With respect to the target, the operation of the optical position-tracking system 200 is passive and tetherless. Compact, low cost, and low power consumption implementations are possible with the optical position-tracking system 200. Moreover, the optical position-tracking system 200 is easily scalable. The number of components illustrated in FIG. 2 is sufficient to track the motion of the target in either a short range application or a long range application. However, the capability requirements of these components in these applications may be different.

Figure 4A:
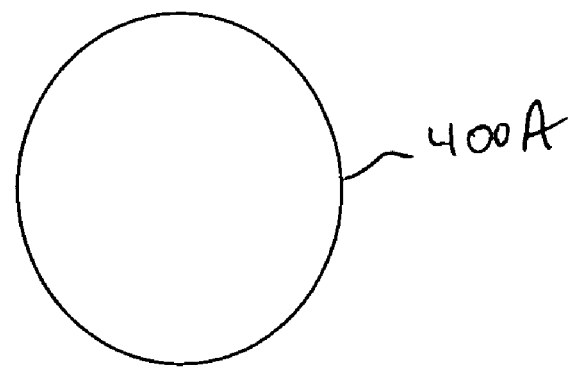
FIG. 4A illustrates a circular cross-section of a light beam of embodiments in accordance with the invention.

FIG. 4A illustrates a circular cross-section 400A of a light beam of embodiments in accordance with the invention. A light beam having this circular cross-section 400A can be utilized in optical position-tracking system 200 (FIG. 2). The smaller the circular cross-section 400A the greater the resolution of optical position-tracking system 200 (FIG. 2).

Figure 4B:
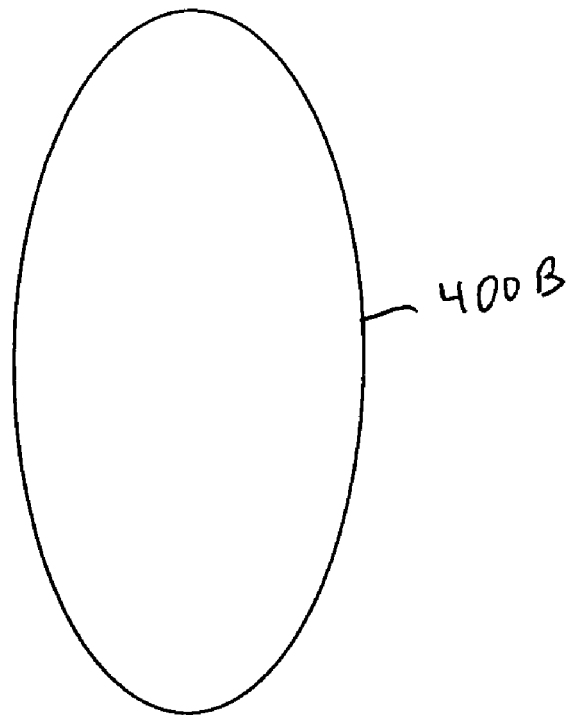
FIG. 4B illustrates an elliptical cross-section of a light beam of embodiments in accordance with the invention.

FIG. 4B illustrates an elliptical cross-section 400B of a light beam of embodiments in accordance with the invention. A light beam having the elliptical cross-section 400B can be utilized in optical position-tracking system 200 (FIG. 2) to provide some tracking tolerance if target 205 is moved perpendicular to the sweeping direction of the light beam steering devices. Since the elliptical cross-section 400B extends perpendicular to the sweeping direction, the tracking range of optical position-tracking system 200 (FIG. 2) can be extended perpendicular to the sweeping direction.

Figure 5:
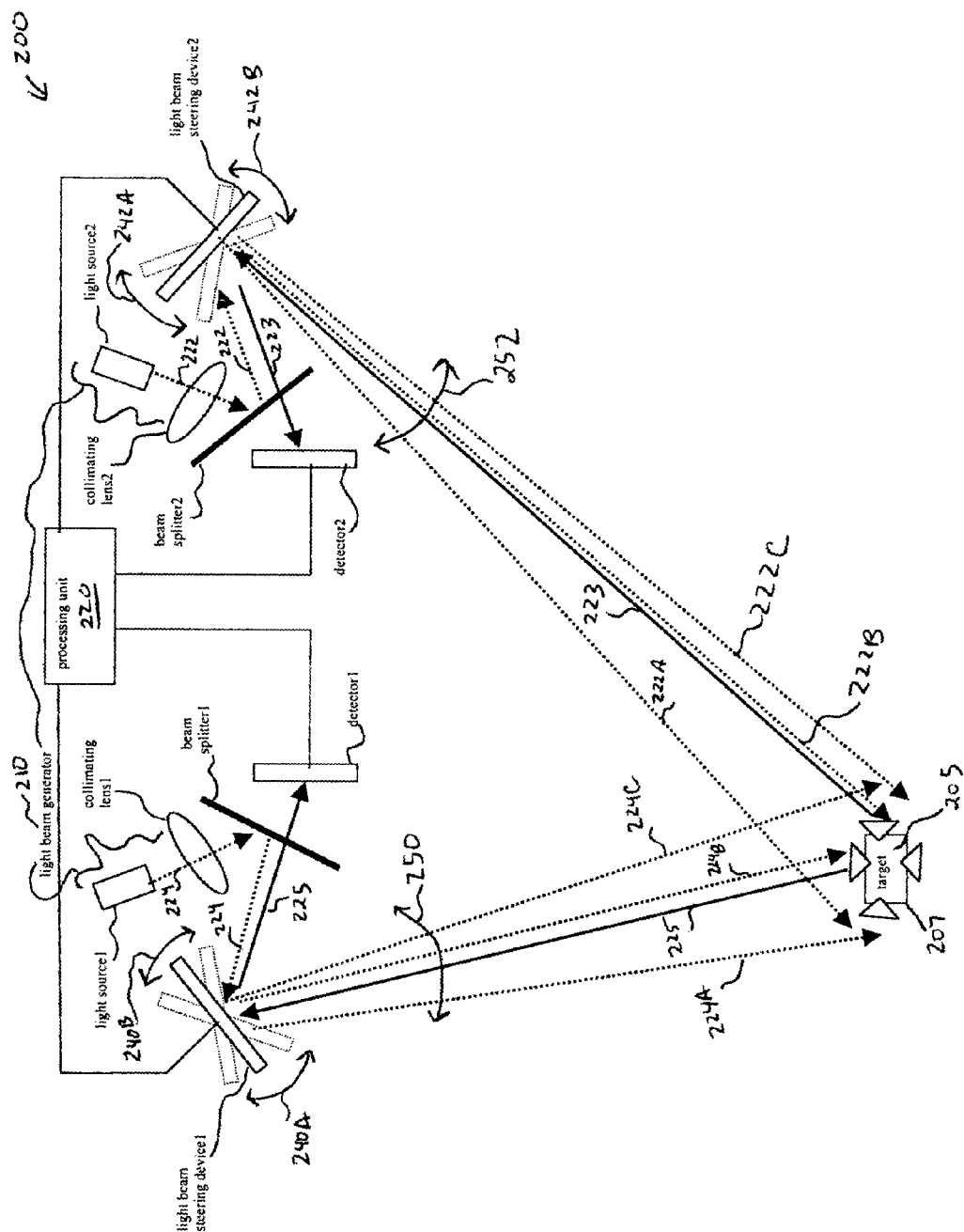
FIG. 5 illustrates the optical position-tracking system of FIG. 2 operating in a limited sweeping mode of embodiments in accordance with the invention.

FIG. 5 illustrates optical position-tracking system 200 of FIG. 2 operating in a limited sweeping mode of embodiments in accordance with the invention. While in FIG. 2 light beam steering device1 and light beam steering device2 are sweeping through the full angular range 230 and the full angular range 232 respectively, in FIG. 5 light beam steering device1 and light beam steering device2 are sweeping through the limited angular range 250 and the limited angular range 252 respectively. This limited sweeping mode can increase the speed at which target 205 is located and can increase resolution.

In practice, light beam steering device1 and light beam steering device2 initially operate in the full sweeping mode (e.g., full angular range 230 and full angular range 232). However, once target 205 is located at a first angle with respect to light beam steering device1 and at a second angle with respect to light beam steering device2, light beam steering device1 sweeps around the first angle for a limited angular range 250 so that first light beam 224 appears at various angular positions (e.g., 224A-224C). Similarly, light beam steering device2 sweeps around the second angle for a limited angular range 252 so that second light beam 222 appears at various angular positions (e.g., 222A-222C). This dithering movement of light beam steering device1 and light beam steering device2 provides a significant benefit when the motion of target 205 is not expected to vary significantly within a short amount of time. Light beam steering device1 and light beam steering device2 return to operating in the full sweeping mode when target 205 no longer reflects the respective light beam while in the limited sweeping mode.

Figure 6:
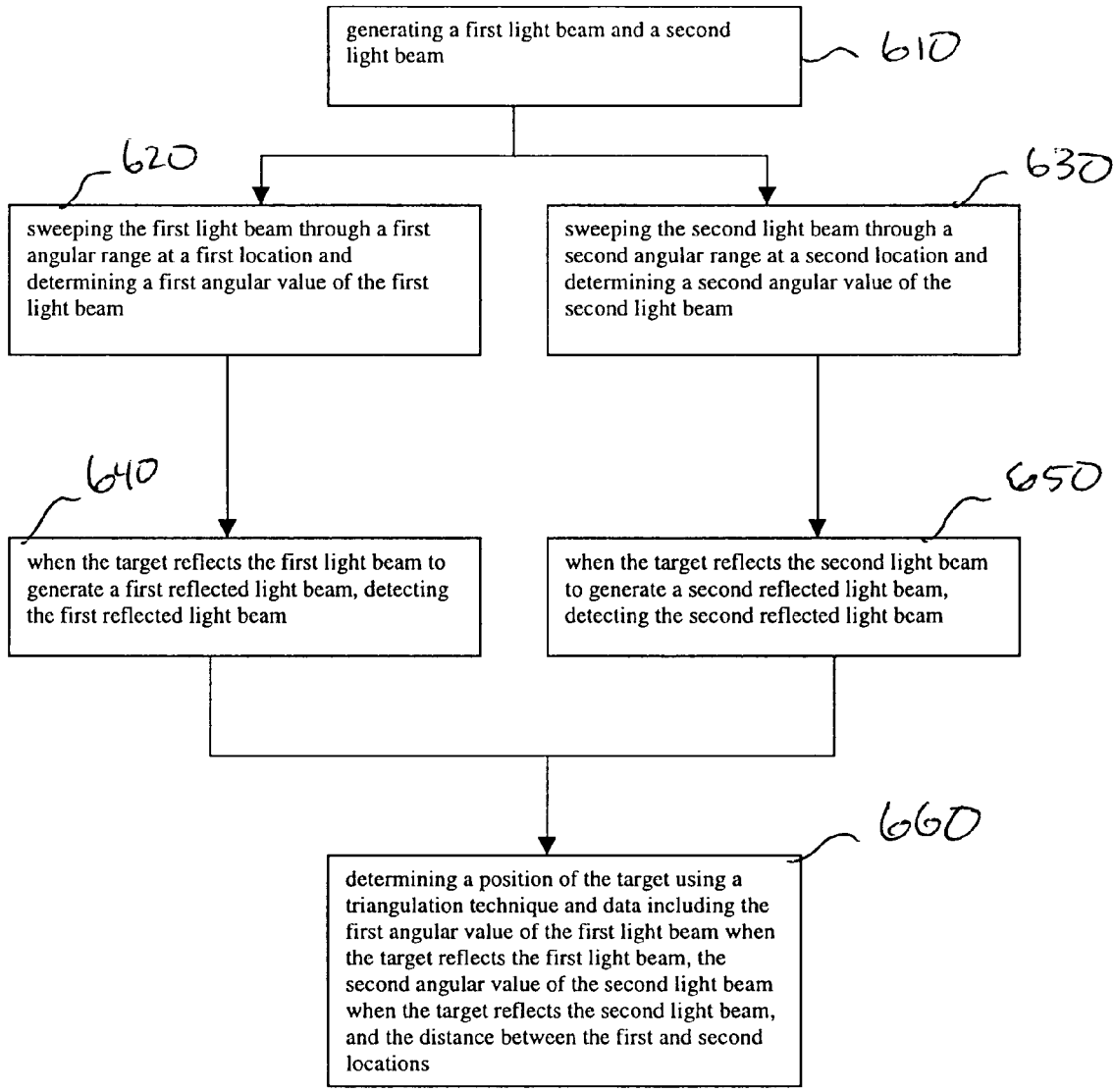
FIG. 6 illustrates a flow chart showing a method of optically tracking a target of embodiments in accordance with the invention.

FIG. 6 illustrates a flow chart showing a method 600 of optically tracking a target of embodiments in accordance with the invention.

At Step 610, a first light beam and a second light beam are generated. Moreover, in an embodiment in accordance with the invention, Step 620 and Step 640 occur concurrently with Step 630 and Step 650.

Continuing, at Step 620, the first light beam is swept through a first angular range at a first location by a first light beam steering device. A first angular value of the first light beam is determined and tracked. The first light beam is swept through the first angular range to cause a reflection of the first light beam by a target. Furthermore, at Step 640, the first reflected light beam is detected when the target reflects the first light beam to generate the first reflected light beam.

Similarly at Step 630, the second light beam is swept through a second angular range at a second location by a second light beam steering device. A second angular value of the second light beam is determined and tracked. The second light beam is swept through the second angular range to cause a reflection of the second light beam by the target. At step 650, the second reflected light beam is detected when the target reflects the second light beam to generate the second reflected light beam.

At Step 660, when the target causes a reflection of the first and second light beams, the absolute position of the target can be determined. A triangulation technique that utilizes data is used. Data, such as the first angular value of the first light beam when the target reflects the first light beam, the second angular value of the second light beam when the target reflects the second light beam, and the distance between the first and second locations, are used.

The foregoing descriptions of specific embodiments in accordance with the invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A system for determining a position of a target, comprising:

a processing unit;

the target, the target being reflective and moveable;

a first light source, a first light beam splitter, a first light beam steering device and a first light detector, the first light source being configured to emit a first light beam towards the first light beam splitter, the first light beam splitter being configured to reflect the first light beam emitted by the first light source towards the first light beam steering device, the first light beam steering device being configured, under control of the processing unit, to sweep the first light beam over a first full angular range when operating in a first full sweep mode, and over a first limited angular range when operating in a first limited sweep mode, the first full angular range being greater than the first limited angular range, the target being configured to reflect the first light beam reflected from the first light beam steering device back towards the first light beam steering device for reflection therefrom as a first target reflected beam and thence towards and through the first light beam splitter to the first light detector for detection thereby;

a second light source, a second light beam splitter, a second light beam steering device and a second light detector, the second light source being configured to emit a second light beam towards the second light beam splitter, the second beam splitter being configured to reflect the second light beam emitted by the second light source towards the second light beam steering device, the second light beam steering device being configured, under control of the processing unit, to sweep the second light beam over a second full angular range when operating in a second full sweep mode, and over a second limited angular range when operating in a second limited sweep mode, the second full angular range being greater than the second limited angular range, the target being configured to reflect the second light beam reflected from the second light beam steering device back towards the second light beam steering device for reflection therefrom as a second target reflected beam and thence towards and through the second light beam splitter to the second light detector for detection thereby;

wherein the processing unit is operably connected to the first and second light beam steering devices and configured to cause: (a) the first light beam steering device to operate in the first full sweep mode until the target is detected near a first angle as a result of the first target reflected beam being reflected into the first light detector; (b) the second light beam steering device to operate in the second full sweep mode until the target is detected near a second angle as a result of the second target reflected beam being reflected into the second light detector; (c) the first light beam steering device to operate in the first limited sweep mode near the first angle in response to the first target reflected beam being detected by the first light detector; and (d) the second light beam steering device to operate in the second limited sweep mode near the second angle in response to the second target reflected beam being detected by the second light detector.

2. The optical position tracking system of claim 1, wherein the processing unit is configured to determine the position of the target on the basis of the first angle and the second angle.

3. The optical position tracking system of claim 1, wherein the processing unit is configured to determine an absolute position of the target based on the first angle and the second angle.

4. The optical position tracking system of claim 1, wherein the first beam steering device is configured to dither about the first angle when operating in the first limited sweep mode.

5. The optical position tracking system of claim 1, wherein the second beam steering device is configured to dither about the second angle when operating in the second limited sweep mode.

6. The optical position tracking system of claim 1, wherein the first beam steering device is configured to resume operating in the first full sweep mode is no longer detected by the system.

7. The optical position tracking system of claim 1, wherein the second beam steering device is configured to resume operating in the second full sweep mode after the target is no longer detected by the system.

8. The optical position tracking system of claim 1, wherein the target includes a retro-reflecting surface.

9. The optical position tracking system of claim 1, wherein at least one of the first light beam steering device and the second light beam steering device is selected from a group consisting of a MEMS (micro-electromechanical system) motor beam steering device, a galvanometer beam steering device, an acousto-optic beam steering device, an electro-optic beam steering device, a grating structure beam steering device, a holographic structure beam steering device, and a scanning mirror beam steering device.

10. The optical position tracking system of claim 1, wherein at least one of the first light beam and the second light beam is generated by a light source selected from a group consisting of an incandescent technology-based light source, an LED (light emitting diode) technology-based light source, a semiconductor laser technology-based light source, and a rare-earth laser technology-based light source.

11. The optical position tracking system of claim 1, further comprising means for enabling a cursor in a computer to be controlled according to the position of the target.

12. The optical position tracking system of claim 1, further comprising means for inputting data representative of the position of the target.

13. A method of determining a position of a target using a system comprising a processing unit, the target, the target being reflective and moveable, a first light source, a first light beam splitter, a first light beam steering device and a first light detector, the first light source being configured to emit a first light beam towards the first light beam splitter, the first light beam splitter being configured to reflect the first light beam emitted by the first light source towards the first light beam steering device, the first light beam steering device being configured, under control of the processing unit, to sweep the first light beam over a first full angular range when operating in a first full sweep mode, and over a first limited angular range when operating in a first limited sweep mode, the first full angular range being greater than the first limited angular range, the target being configured to reflect the first light beam reflected from the first light beam steering device back towards the first light beam steering device for reflection therefrom as a first target reflected beam and thence towards and through the first light beam splitter to the first light detector for detection thereby, a second light source, a second light beam splitter, a second light beam steering device and a second light detector, the second light source being configured to emit a second light beam towards the second light beam splitter, the second beam splitter being configured to reflect the second light beam emitted by the second light source towards the second light beam steering device, the second light beam steering device being configured, under control of the processing unit, to sweep the second light beam over a second full angular range when operating in a second full sweep mode, and over a second limited angular range when operating in a second limited sweep mode, the second full angular range being greater than the second limited angular range, the target being configured to reflect the second light beam reflected from the second light beam steering device back towards the second light beam steering device for reflection therefrom as a second target reflected beam and thence towards and through the second light beam splitter to the second light detector for detection thereby, wherein the processing unit is operably connected to the first and second light beam steering devices and configured to cause: (a) the first light beam steering device to operate in the first full sweep mode until the target is detected near a first angle as a result of the first target reflected beam being reflected into the first light detector; (b) the second light beam steering device to operate in the second full sweep mode until the target is detected near a second angle as a result of the second target reflected beam being reflected into the second light detector; (c) the first light beam steering device to operate in the first limited sweep mode near the first angle in response to the first target reflected beam being detected by the first light detector; and (d) the second light beam steering device to operate in the second limited sweep mode near the second angle in response to the second target reflected beam being detected by the second light detector, the method comprising:

operating the first light beam steering device in the first full sweep mode until the target is detected near the first angle thereby;

operating the first light beam steering device in the first limited sweep mode near the first angle after the target has been detected;

operating the second light beam steering device in the second full sweep mode until the target is detected near the second angle thereby;

operating the second light beam steering device in the second limited sweep mode near the second angle after the target has been detected;

determining, with the processing unit, the position of the target based on the first angle and the second angle.

14. The method of claim 13, further comprising dithering the first beam steering device about the position of the target near the first angle when operating in the first limited sweep mode.

15. The method of claim 13, further comprising dithering the second beam steering device about the position of the target near the second angle when operating in the second limited sweep mode.

16. The method of claim 13, further comprising the first beam steering device resuming operating in the first full sweep mode after the target is no longer detected by the system.

17. The method of claim 13, further comprising the second beam steering device resuming operating in the second full sweep mode after the target is no longer detected by the system.

18. The method of claim 13, wherein determining the position of the target further comprises determining the absolute position of the target.

19. The method of claim 13, further comprising controlling a cursor in a computer according to the position of the target.

20. The method of claim 13, further comprising inputting data representative of the position of the target to a computer.

* * * * *

UNITED STATES PATENT AND TRADEMARK OFFICE
CERTIFICATE OF CORRECTION

PATENT NO. : 7,359,041 B2
APPLICATION NO. : 10/655944
DATED : April 15, 2008
INVENTOR(S) : Tong Xie et al.

It is certified that error appears in the above-identified patent and that said Letters Patent is hereby corrected as shown below:

Column 9, Line 48, Claim 6, delete "mode" and insert -- mode after the target --.

Signed and Sealed this

Eighth Day of June, 2010

David J. Kappos
*Director of the United States Patent and Trademark Office*